United States Patent Office 2,861,960
Patented Nov. 25, 1958

2,861,960
HYDROCARBON CONVERSION PROCESS AND CATALYSTS

Frank Edward De Boer and Edmund Field, Chicago, Ill., assignors to Standard Oil Company, Chicago, Ill., a corporation of Indiana No Drawing. Application November 16, 1955
Serial No. 547,295

7 Claims. (Cl. 252—466)

This invention relates to the catalytic conversion of hydrocarbons. More particularly, it relates to the hydroforming of petroleum naphthas and to an improved catalyst therefor.

Platinum catalysts have now been employed on a commercial scale in a wide range of reactions, most of them involving hydrogenation, dehydrogenation, oxidation, isomerization, and dehydrocyclization. Especially successful has been the use of alumina-supported platinum catalysts in the conversion of low-octane petroleum naphthas under hydroforming conditions into gasolines of high antiknock rating. In a typical platinum hydroforming process, a mixture of charging stock and hydrogen-containing gas is passed through a bed of catalyst consisting essentially of between about 0.05 to 1 percent by weight of platinum supported on alumina, where the hydroforming reactions are carried out at a temperature in the range of about 800 to 1000° F., a total pressure between about 100 and 1200 pounds per square inch gage, a hydrogen partial pressure between about 50 and 1000 pounds per square inch, a hydrogen rate of 2,000 to 10,000 standard cubic feet per barrel of charging stock, and an hourly weight space velocity between about 0.5 and 10. In this process, the activity and selectivity of the catalyst depend upon a variety of factors, such as the identity and condition of the catalyst components, the mode of catalyst preparation, the presence or absence of promoters and modifiers, the presence or absence of contaminating materials in the charging stock and the proportion thereof, the conversion temperature, the hydrogen partial pressure in the conversion zone, and the like. Suitable catalysts are conveniently prepared by commingling a platinum compound with hydrous alumina and thereafter drying and calcining. We have now discovered a new catalyst-preparation technique which affords an alumina-supported platinum catalyst of greatly improved catalytic properties.

It is accordingly an object of our invention to improve the conversion of hydrocarbons, and in particular the hydroforming of petroleum naphthas. Another object is to prepare an alumina-supported catalyst of superior catalytic properties. These and other objects of our invention will be apparent from the following description.

In one aspect, our invention is a catalyst preparation method, involving the steps of commingling alumina with a solution of a coordination compound of a platinum dihalide and an olefinic hydrocarbon or other organic compound containing olefinic unsaturation, and drying and calcining.

In another aspect, our invention is a hydrocarbon conversion process employing a catalyst prepared in the aforesaid manner. Our invention is particularly suited to the hydroforming of petroleum naphthas under conditions set forth hereinabove.

In a specific embodiment of our invention, we commingle solid, hydrous alumina with a benzene solution of a dihaloalkyleneplatinum (II) such as dichloroethyleneplatinum (II) in a quantity sufficient to incorporate between about 0.05 and 1 percent by weight of platinum therein, based on dry $Al_2O_3$, then treat with steam at around 250 to 500° F. for 0.1 to 1 hour, whereby the coordination compound is decomposed and metallic platinum is deposited in and on the alumina, and finally dry and calcine.

The platinum compositions employed in connection with our invention may be characterized as coordination compounds of a platinous (i. e., bivalent platinum) halide with an organic compound containing an olefinic double bond between two carbon atoms. Such platinum compounds may be defined by the general formula, $$(RPtX_2)_n$$

where R is an organic compound containing (and attached to platinum through) olefinic unsaturation, X is chlorine, fluorine, iodine, or bromine attached to platinum, and $n$ is a positive integer. The following compounds are illustrative:

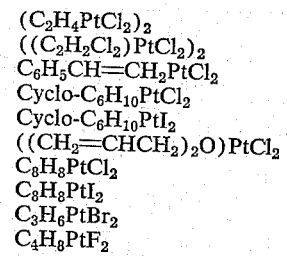

It will be apparent that the coordination compounds may contain various functional substituents or interpolations on or in the organic nucleus (e. g., halogen, hydroxyl, carboxyl, ketonic oxygen, aldehydic oxygen, ester groups, and the like), so long as they do not render the compound insoluble and do not adversely affect the catalytic activity of the platinum. In a preferred embodiment, the platinum composition is a coordination compound of platinous chloride ($PtCl_2$) with an olefinic hydrocarbon such as ethylene, propylene, butylene, butadiene, styrene, cyclohexene, or the like, containing from 2 to 10 carbon atoms in the molecule. The preparation of coordination compounds of the foregoing types is well known to the art, having been described, for example, by Keller (Chem. Rev., 28 (1940), 229–267), Jensen (Acta Chem. Scand., 7 (1953), 866–8), and others.

An especially suitable composition for use in accordance with our invention is dichloroethyleneplatinum (II). This material can be prepared in a variety of ways, as disclosed, for example, by Anderson (J. Chem. Soc., 1934, 971) and by Kharasch and Ashford (J. Am. Chem. Soc., 58 (1936), 1733). One convenient preparation method involves the addition of ethylene to platinum tetrachloride in benzene solution under anhydrous conditions at about 70° C. In another method, platinum dichloride is reacted with ethylene in anhydrous hydrochloric acid-ethanol solution. Other methods include refluxing platinum tetrachloride with ethanol, refluxing sodium chloroplatinate with ethanol, and reacting potassium chloroplatinite with ethylene in an aqueous alcohol at room temperature. These methods are generally applicable to the preparation of the broad class of coordination compounds employed in our invention, but vary in convenience and yield of product, depending upon the particular reaction materials employed.

The completed platinum coordination compound may be isolated and purified by recrystallization, if desired. Ordinarily, however, it can be used in the form of its solution, as obtained from the preparation procedure, for impregnating alumina in accordance with our invention. In any event, the coordination compound should be employed in the form of a solution in a suitable solvent, such as benzene, dioxane, an aliphatic ether, a lower aliphatic alcohol, or the like. Aqueous solvents tend to hydrolize and destroy the coordination compound prematurely, and should preferably be avoided for this reason. The coordination compound is suitably made up into a solution containing from about 5 to 15 weight-percent of platinum for use in impregnating alumina. After the impregnation has been carried to the desired platinum level, the coordination compound may be decomposed by boiling in water, treating with steam at 250 to 500° F. or higher, or treating with hydrogen at 600 to 1200° F. to deposit platinum in active form in the alumina. The decomposition is rapid, so that from about 0.1 to 1 hour of such treatment is ordinarily sufficient. Before the decomposition, the impregnating solvent may be removed by drying, if desired, to help in fixing the coordination compound within the structure of the alumina.

As the source of alumina for our catalyst, we may suitably employ an alumina organosol or solid, hydrous alumina, preferably eta-alumina or gamma-alumina, derived from alumina hydrosol, alumina hydrogel, alumina xerogel, alumina monohydrate, sintered alumina, or the like, all of which can be prepared according to methods described in the art. Into the alumina may be incorporated a promoting adjuvant if desired, such as chloride, fluoride, silica, boria, chromia, an oxide of phosphorus, or the like, suitably in a proportion between about 0.1 and 8 percent by weight, based on dry $Al_2O_3$.

In a preferred embodiment, we employ an alumina prepared by alkali-aging a peptized hydrous alumina at a pH between about 8.5 and 12, drying the treated alumina to a water content below about 50 percent by weight, wet basis, impregnating with platinum coordination compound, and drying and calcining.

Hydrosols or slurries of peptized alumina can be prepared by a variety of methods, such as by hydrolyzing aluminum acetate or an aluminum alkoxide in an aqueous medium under controlled pH conditions, digesting hydrous alumina in dilute acid, preferably a weak organic acid, or the like. Alumina hydrosols are most conveniently prepared, however, by the technique described in Heard Re. 22,196 (October 6, 1942), according to which amalgamated aluminum is digested in water in the presence of a low concentration (suitably between about 1 and 10 percent by weight, preferably around 2 percent) of acetic acid or other water-soluble aliphatic carboxylic acid as a peptizing agent. Hydrosols obtained in this way are syrupy or opalescent, nearly transparent in appearance, and contain between about 2 and 10 percent by weight of $Al_2O_3$.

The alkali-aging of peptized alumina to prepare an improved form of hydrous alumina is described and claimed by Brennan, Vander Haar, and Field in application Ser. No. 416,441, filed March 15, 1954 (now abandoned), and in Serial No. 501,618, filed April 15, 1955, as a continuation-in-part thereof. In accordance with the Brennan et al. technique, a Heard-type alumina hydrosol or other suitably prepared form of peptized aluminia is stirred and commingled with an alkaline substance, preferably ammonia or ammonium hydroxide, in a quantity sufficient to raise the pH above about 8.5, but insufficient to convert any considerable proportion of the alumina into an aluminate salt, i. e., below about pH 12 and preferably between about pH 10 and 11. The alkalized alumina is aged for about 1 to 100 hours or more at about 50 to 250° F., preferably at ordinary temperatures around 70 to 100° F. for about 75 to 150 hours (shorter aging periods corresponding generally to the higher pH levels and in lesser degree to higher temperatures). A slurry of white, finely divided hydrous alumina is obtained thereby, and is filtered to separate the alumina. The alumina cake is dried ordinarily at elevated temperatures up to about 500° F., preferably between about 150 and 400° F., to a volatiles content less than about 50 percent, wet basis, preferably between about 15 and 40 percent.

The dried alumina thus obtained may suitably be combined, in accordance with our invention, with a platinum coordination compound as defined hereinabove in an amount sufficient to incorporate from about 0.05 to 1 percent by weight of platinum therein, based on dry $Al_2O_3$. The mixture of alumina and platinum compound is dried at about 200 to 400° F. or higher, a drying period of about 6 to 24 hours being ordinarily adequate, and may be calcined if desired at 800 to 1200° F. for 1 to 24 hours.

The platinum-alumina composite may be treated if desired to incorporate therein an aluminum halide, i. e., aluminum chloride, fluoride, bromide, or iodide, in a ratio between about 0.001 and 0.02 mole per mole of anhydrous $Al_2O_3$. This can conveniently be done, for example, by impregnating the composite with a solution of such a salt, adapted to wet the catalyst surfaces while avoiding any depletive washing action on the platinum contained therein. The catalyst is then dried and calcined under the conditions set forth above. Alternatively, the platinum-alumina composite can be exposed to contact with vapors of aluminum halide until the designated quantity of the salt has been incorporated therein.

Our invention will be more fully understood from the following specific example:

Dichloroethyleneplatinum (II) was prepared according to the following procedure. A solution of 21.5 grams of hydrous chloroplatinic acid (40 percent Pt) and 3.5 grams of sodium hydroxide pellets in 200 milliliters of anhydrous ethanol was refluxed for five hours, and the ethanol was then stripped out at room temperature under reduced pressure. The liquid that remained was taken up in chloroform, leaving a solid residue of sodium chloride. The chloroform was distilled off from the solution, leaving dichloroethyleneplatinum (II) as the residue. This material was further purified by dissolving in chloroform, filtering, and evaporating the chloroform.

A solution of 0.55 gram of dichloroethyleneplatinum (II), prepared as described above, in 100 milliliters of benzene was mixed with 160 grams of ammonia-aged alumina (37.1 percent water, wet basis) in a blender, and the mixture was dried overnight at 220° F. The dried cake was lubricated with 4 percent of Sterotex (a hydrogenated coconut oil), formed into ⅛" x ⅛" cylindrical pellets, and calcined at 1100° F. for 6 hours.

The completed catalyst, containing 0.35 percent by weight of platinum, based on dry $Al_2O_3$, was subjected to a hydroforming activity test under standardized conditions employing 50 milliliters of catalyst in a quasi-isothermal reaction zone surrounded by an electrically heated block for temperature control. The test was carried out at a catalyst outlet temperature of 920° F., a pressure of 200 pounds per square inch gage, an hourly weight space velocity of 2, and a once-through hydrogen rate of 5,000 standard cubic feet per barrel of feed. The feed was a Mid-Continent virgin naphtha having an ASTM distillation range of 210 to 356° F., a CFR-R octane number of 44.0, an API gravity of 55.2°, a Reid vapor pressure of 1.1 pounds per square inch, and a composition consisting of 50.0 percent by volume of paraffins, a trace of olefins, 41.5 percent naphthenes, 8.5 percent aromatics, 0.028 wt. percent sulfur, and 0.01 wt. percent nitrogen (Kjeldahl). The catalyst activity was calculated as the relative quantity, expressed as a percentage, of an arbitrarily chosen standard catalyst required to produce a $C_5+$ product fraction having the same octane number under the same test conditions. The results were as follows:

| Product Interval, hr. | Coordination Compound | |
|---|---|---|
| | Product Octane, CFR-R | Catalyst Activity |
| 0-20 | 96.6 | 108.5 |
| 20-40 | 95.6 | 89.4 |
| 40-60 | 94.0 | 75.4 |
| 60-80 | 92.5 | 63.0 |
| 80-100 | 92.1 | 56.2 |
| 100-110 | 89.2 | 50.2 |

Our improved catalysts are broadly useful in hydrocarbon-conversion reactions which are catalyzed by platinum. Specifically, our catalysts are useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art, as set forth above. Our catalysts are especially advantageous in the hydroforming of petroleum naphthas boiling in the range of about 200–400° F., and are capable of upgrading a 50 percent naphthenic naphtha having a CFR-R octane number of only 40 to 50 into a $C_5+$ gasoline having an octane number of 90 to 100 in a yield of 80 to 85 percent.

While we have described our invention with reference to certain specific embodiments thereof, it is to be understood that such embodiments are illustrative only and not by way of limitation. Numerous modifications and equivalents of our invention will be apparent from the foregoing description to those skilled in the art.

In accordance with the foregoing description, we claim as our invention:

1. A method for preparing an alumina-supported platinum catalyst which comprises commingling with alumina a solution of a coordination compound of a platinous halide and an organic compound containing an olefinic double bond between two carbon atoms, decomposing the platinum coordination compound within the alumina to deposit platinum therein, and calcining the resulting composite.

2. A method for preparing an alumina-supported platinum catalyst which comprises impregnating solid, hydrous alumina with a solution of a coordination compound of a platinum dihalide and an olefinic hydrocarbon, decomposing the platinum coordination compound contained in the impregnated alumina to deposit platinum therein, and calcining the resulting composite.

3. The method of claim 2 wherein said coordination compound is a dihaloalkyleneplatinum (II).

4. The method of claim 2 wherein said platinum dihalide is platinum dichloride.

5. The method of claim 2 wherein said coordination compound is dichloroethyleneplatinum (II).

6. A method for preparing an improved platinum-alumina catalyst, which comprises alkali-aging a peptized alumina at a pH between about 8.5 and 12 for a period in excess of about 1 hour, drying the alkali-aged alumina to a volatiles content less than about 50 percent by weight, wet basis, impregnating the dried alumina with a solution of a coordination compound of a platinous halide and an organic compound containing an olefinic double bond between two carbon atoms, decomposing the platinum coordination compound contained in the impregnated alumina to deposit platinum therein, and calcining the resulting composite.

7. A method for preparing an improved platinum-alumina catalyst, which comprises alkali-aging an alumina hydrosol at a pH between about 8.5 and 12 for a period of about 1 to 100 hours, whereby a filterable slurry of hydrous alumina is obtained, drying said hydrous alumina to a volatiles content between about 15 and 40 percent by weight, wet basis, incorporating therein a solution of a coordination compound of a platinum dihalide and an olefinic hydrocarbon, decomposing the platinum coordination compound contained in the impregnated alumina to deposit platinum therein, and calcining the resulting composite.

References Cited in the file of this patent

UNITED STATES PATENTS

| Re. 22,196 | Heard | Oct. 6, 1942 |
| 2,475,155 | Rosenblatt | July 5, 1949 |
| 2,479,110 | Haensel | Aug. 16, 1949 |
| 2,623,860 | Haensel | Dec. 30, 1952 |
| 2,746,937 | Hunter et al. | May 22, 1956 |
| 2,777,805 | Lefrancois et al. | Jan. 15, 1957 |

FOREIGN PATENTS

| 1,080,855 | France | June 2, 1954 |